United States Patent [19]

Di Palma et al.

[11] 4,292,383

[45] Sep. 29, 1981

[54] BILEVEL RECHARGEABLE CELL

[75] Inventors: Ralph Di Palma, New Hyde Park; Arthur Phillips, White Plains, both of N.Y.

[73] Assignee: Duracell International Inc., Bethel, Conn.

[21] Appl. No.: 96,582

[22] Filed: Nov. 21, 1979

Related U.S. Application Data

[63] Continuation of Ser. No. 956,479, Oct. 30, 1978, abandoned.

[51] Int. Cl.³ .............................................. H01M 4/34
[52] U.S. Cl. ..................................... 429/219; 429/229
[58] Field of Search ............... 429/219, 206, 229–231; 252/513, 514, 518

[56] References Cited

U.S. PATENT DOCUMENTS

| | | |
|---|---|---|
| 3,483,259 | 12/1969 | Seiger et al. .................... 429/219 |
| 3,520,729 | 7/1970 | Voss et al. ....................... 429/219 |
| 3,772,083 | 11/1973 | Mead ........................... 429/219 X |
| 3,918,988 | 11/1975 | Abens .......................... 429/219 X |
| 4,015,056 | 3/1977 | Megahed ......................... 429/219 |
| 4,068,049 | 1/1978 | Naruishi et al. ............... 429/219 X |
| 4,078,125 | 3/1978 | Brown .......................... 429/219 X |
| 4,126,584 | 11/1978 | Borbely ........................ 429/219 X |
| 4,136,236 | 1/1979 | Ruetschi ....................... 429/219 X |

Primary Examiner—Charles F. LeFevour
Attorney, Agent, or Firm—Ronald S. Cornell; Israel Nissenbaum; Martin M. Glazer

[57] ABSTRACT

A cell having an anode, a cathode, barrier means between the cathode and anode, and an electrolyte in contact with all the elements of the cell, the cathode being formed from a mixture of monovalent silver oxide and nickel. The cathode can also be formed from a mixture of monovalent silver oxide, a material such as mercuric oxide, and silver, nickel or a mixture of silver and nickel.

8 Claims, 4 Drawing Figures

BILEVEL RECHARGEABLE CELL

This is a continuation of application Ser. No. 956,479, filed Oct. 30, 1978 now abandoned.

FIELD OF THE INVENTION

This invention relates to rechargeable electrochemical cells containing monovalent silver oxide and more particularly to cells having improved rechargeability.

BACKGROUND OF THE INVENTION

In the usual cell containing monovalent silver oxide, the silver oxide is formed into a cathode, placed into a cell casing, and an electrolyte is added. A barrier or separator is positioned within the cell to separate the cathode from an anode which is also incorporated into the cell. In the completed cell the electrolyte is in contact with the cathode, anode, separator and casing. On discharge of the cell, the monovalent silver oxide in the cathode is reduced to elemental silver. The reduction of the silver oxide is believed to occur in a generally layered fashion, beginning at the interface of the cathode and separator and proceeding away from the separator.

In order to use the silver oxide cathode in a secondary cell, the layering process must be reversed during the recharging cycle. In most cases the layering process cannot be fully reversed, and this result in incomplete conversion of the silver into monovalent silver oxide. The partial reversibility of the layering process limits the capacity of the cell to accept a charge and limits the number of discharge-recharge cycles that the cell will undergo before complete exhaustion.

As a result of the inability of the layering process to be completely reversed, attempts to recharge the cell can result in an overcharge situation. During overcharge of a cell containing silver oxide, gasses such as hydrogen and oxygen form at the electrodes. These gasses cause a pressure build up in the cell which in turn causes the cell to fail.

Another factor limiting the use of monovalent silver oxide in secondary cells has been an inability to determine the state of discharge of the cell and thus the proper time to recharge the cell. The determination of the state of discharge is difficult because a cell containing monovalent silver oxide produces a flat voltage curve on discharge, and there is no apparent voltage drop until the cell is so close to complete discharge that it can not be fully recharged. The number of discharge-recharge cycles are then lower than if the cell were only partially discharged. Further, in multicelled batteries, complete discharge of any one cell before the other will result in cell reversal with possible undesirable effects such as gassing and leakage.

The inability to determine the state of discharge of the silver oxide cell has limited the use of such cells of primary batteries and to situations involving timed discharge-recharge cycles. Such timed cycles can still result in cells being discharged to the point where they cannot readily accept a recharge, since only time, not true cell capacity was measured. For this and other reasons monovalent silver oxide has not heretofore been widely used in secondary cells.

THE INVENTION

A cathode has now been discovered that substantially improves the ability of a secondary cell containing monovalent silver oxide to undergo repeated discharge-recharge cycles. The cathode can be further modified so that it also provides an indication of when recharging is necessary.

The cathode of the present invention comprises monovalent silver oxide and a metal selected from the group consisting of silver, nickel and mixtures thereof, substantially homogeneously dispersed throughout the cathode. The cathode is incorporated into a rechargeable cell. It is believed that the improved rechargeability is due to the fact that on discharge of the cell the added materials cause the elemental silver produced in the cathode to deposit substantially uniformly throughout the cathode instead of forming layers. On recharging, the deposited elemental silver is substantially uniformly converted into monovalent silver oxide. The degree of rechargeability of the cell is enhanced if the cell is recharged before total exhaustion of the cell. The less elemental silver formed and the more undischarged the anode, the better the cell can be recharged, since the more silver oxide present within the matrix of elemental silver, the more uniformly the silver is converted into silver oxide.

Silver or nickel, or a mixture of silver and nickel is used in the cathode since, in the presence of either (or a mixture of both) elemental silver will form substantially uniformly throughout the cathode instead of in layers. The added silver is in the form of a finely divided powder preferably having a particle size of from about 3 to 10 microns (3 to $10 \times 10^{-6}$ meters). The added nickel is preferably in the form of a powder comprising irregularly shaped particles of small cross section, having an average particle size of from about 2 to 4 microns (2 to $4 \times 10^{-6}$ meters) and a large specific surface area. A preferred nickel powder is sold under the trademark of "Type 255 Carbonyl Nickel" by The International Nickel Company, Inc, New York, N.Y. 10005. The preferred nickel has a large specific surface area and a low apparent density.

Nickel is the preferred additive to the cathode, it is cheaper than silver and because of the large specific surface area of the preferred form of nickel, less nickel is needed in the cathode to achieve the same results as with silver. With the recent increases in the price of silver, acceptable substitutes are taking on greater importance.

A further function of the silver or nickel in the cathode is to reduce any divalent silver peroxide formed during the recharging cycle. The presence of silver peroxide could be detrimental to the functioning of the cell, since the silver peroxide produces a higher voltage on discharge than the monovalent silver oxide and this overvoltage may damage a device powered by the cell.

The presence of the elemental silver and/or nickel in the cathode at the time the cell is assembled permits the fully charged cell to be charged to some degree when first put into service, since any divalent silver peroxide produced during this charge will react with the metal present and be reduced to monovalent silver oxide. The degree of overcharge that the cell can tolerate is dependent on the amount of metal present in the cathode and on the degree of partial discharge built into the anode in the cell. This is an important feature, since in many applications the cell can be subject to a period of charge before any discharge has occured.

The cathode of the present invention can be modified so that it contains among its several constituents a material selected from the group consisting of mercuric oxide, cadmium oxide, cadmium hydroxide and manganese dioxide, which material generates a step voltage on discharge. The voltage step indicates it is time to recharge the cell. This permits the cell to be recharged before it is completely exhausted so that it can more readily accept a re-charge. The step voltage is produced after the monovalent silver oxide has been discharged to exhaustion against the anode at which time the material begins to discharge. A measurable voltage drop or step can then be detected since the discharge of monovalent silver oxide against zinc is 1.55 volts while that of the material against zinc varies from 1.35 volts for manganese dioxide, 1.3 volts for mercuric oxide, 0.9 volts for cadmium hydroxide to 0.5 volts for cadmium oxide.

The voltage step can be observed visually, as when a display dims, or it can be measured electronically. An electronic circuit can be used to monitor the voltage of the battery, and a low drain device, such as a light emitting diode, can be utilized by the circuit to indicate that the voltage has dropped and it is time to recharge the cell. Further, the electronic circuit can automatically recharge the cell after the voltage step.

The relative amounts of monovalent silver oxide, elemental silver or nickel or mixtures thereof, and material present in the cathode determines the relative periods of discharge of each. Preferably the period of discharge of the monovalent silver oxide will be from about fifty to about eighty percent of the total capacity of the cell. A cell of the present invention discharged to this degree can still be readily recharged. Such a discharge period requires an amount of material of from about sixty to about twenty percent by weight of the cathode, with the remainder of the cathode silver oxide and the metal.

The amount of silver or nickel or mixtures thereof present in the cathode must be sufficient to permit the monovalent silver oxide to be reduced substantially uniformly throughout the cathode, and to react with any divalent silver peroxide formed. The amount of silver or nickel or mixtures thereof in the cell cannot be large since it reduces the capacity of the cell. The preferred amount of silver or nickel or a mixture thereof present in the cell, is from about ten to about forty percent by weight of the cathode.

An anode of a cell containing the cathode of the present invention comprises amalgamated zinc, and zinc oxide with an appropriate gelling agent. The zinc oxide is present in the anode so that the cell can be immediately charged when it is installed. With the zinc oxide present in the anode, the charging will proceed without overcharging and the production of undesirable side reactions such as the production of gas. The gelling agent absorbs the electrolyte and causes the anode to swell, this stabilizes the electrolyte within the cell.

The electrolyte used with the cathode of the present invention is preferably of the alkaline type. The preferred electrolyte comprises thirty to forty percent by weight of potassium hydroxide or sodium hydroxide with the remainder water. Another preferred electrolyte, in addition to the thirty to forty percent base, contains four to eight percent by weight zinc oxide. The zinc oxide helps to prevent gassing during the use of the cell.

The number and efficiency of the discharge-recharge cycles of a cell containing the cathode of the present invention can be further improved through the use of an improved separator or barrier means between the cathode and anode. The separator includes at least one layer selected from the group consisting of cellophane, irradiated polyethylene, porous polyvinyl chloride, microporous polypropylene.

The preferred barrier means comprises a double layer of barrier material such as a 0.03 millimeter layer of cellophane and a 0.03 millimeter layer of irradiated polyethylene. The most preferred barrier means comprises two layers of 0.03 millimeter cellophane and two layers of 0.03 millimeter irradiated polyethylene.

BRIEF DESCRIPTION OF THE DRAWINGS

The above and other advantages will become more apparent from the drawings in which.

DETAILED DESCRIPTION OF THE DRAWINGS

Figure 1:
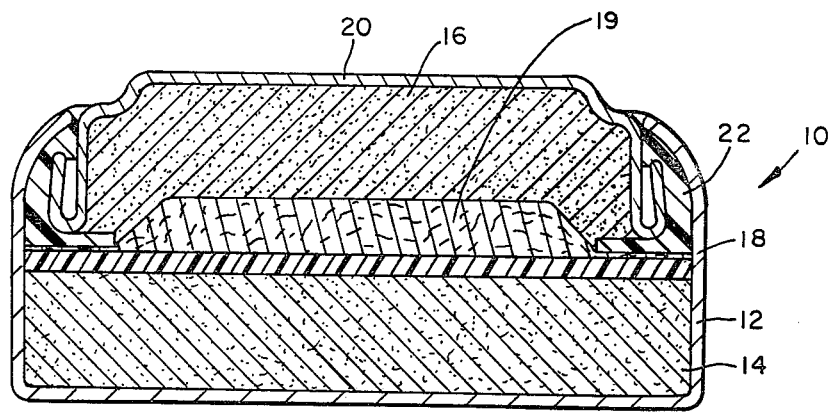
FIG. 1 is a sectional view of a cell of the preferred embodiment of the invention.

In FIG. 1 the battery 10 comprises a single cell. The cathode container 12 can be any suitable material that does not react with the cathode 14 such as nickel plated steel. The cathode 14 comprises monovalent silver oxide, mercuric oxide and elemental silver or nickel or mixtures thereof, substantially uniformly dispersed throughout the cathode 14. The mercuric oxide can be replaced by other materials as manganese dioxide, cadmium oxide and cadmium hydroxide, to give a voltage step different than that of the mercuric oxide. The cathode 14 is separated from an anode 16 by barrier means or separator 18 and absorbent layer 19.

Barrier means 18 is preferably comprised of two or more sheets of barrier material constructed of one or more layers of cellophane and one or more layers of irradiated polyethylene. In a preferred embodiment, two layers of each material are used to form the separator. This separator resists the formation of bridges or dendrites between the cathode and anode during recharge. These bridges of material short circuit the cells in which they form. The barrier means of the present invention thus helps to prevent short circuiting during recharge.

Absorbent layer 19 is shown in place between the anode 16 and the separator 18. The absorbent layer 19 holds the electrolyte within the battery 10. The absorbent 10 is comprised of a mat of non-woven cotton felt. The anode 16 comprises a mixture of zinc, zinc oxide and mercury. The anode container 20 can be of any suitable conductive material with a preferred material being steel with an outer plating of nickel and an inner plating of copper. There must, of course, be no reaction with the anode 16. The anode container 20 is held in place and electrically separated from cathode container 12 by a grommet 22. Grommet 22 prevents any material from escaping or entering the cell 10. The electrolyte can be any suitable alkaline electrolyte of the type well known in the art. Preferred electrolytes are generally potassium hydroxide solutions which may contain other adjuvants such as zinc oxide.

Figure 2:
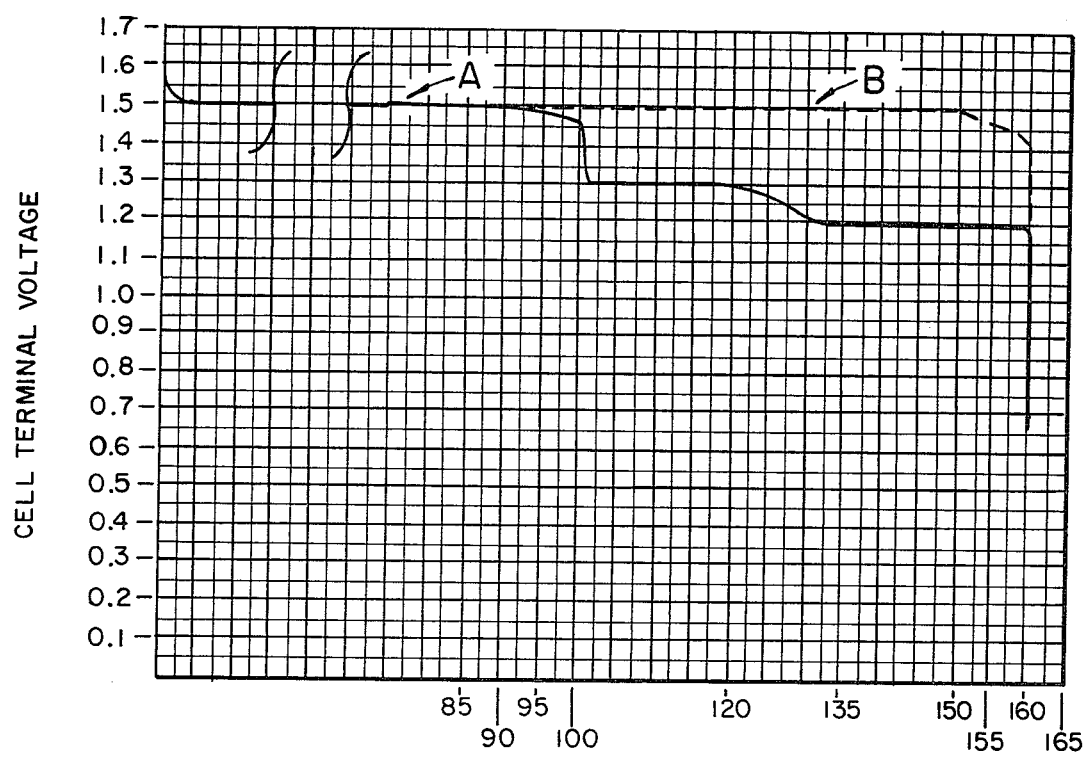
FIG. 2 graphically illustrates the average discharge voltage verses time for a ten cell group.

In FIG. 2, line A graphically illustrates the average discharge voltage verses time for a ten cell group. The cells contain a cathode made in accordance with the present invention comprising monovalent silver oxide, mercuric oxide and elemental silver substantially uniformly dispersed through the cathode, an amalgamated zinc and zinc oxide anode with an aqueous potassium hydroxide electrolyte.

Initially, the ten cells discharged at 1.5 volts, the discharge voltage of monovalent silver oxide. At an average of about 102 hours, the voltage dropped from 1.5 volts to 1.3 volts, signaling the exhaustion of the silver oxide component of the cathode and the beginning of the discharge of the mercuric oxide. The drop in voltage was a signal that it was time to recharge the cell. Of the actual ten cells in the group, the earliest discharge of the mercuric oxide was at 100 hours and the latest at 104 hours.

The voltage drop between 120 hours and 130 hours is typical of the discharge curve of a cathode containing mercuric oxide. This voltage drop occurs because as the cell discharges the surface area of the anode decreases and the amount of available electrolyte decreases. These two factors cause the internal resistance of the cell to increase. The increased internal resistance becomes apparent as a drop in the voltage of the cell. Between 150 hours and 165 hours the mercuric oxide in all ten cells was exhausted. The average total capacity of all ten cells was about 160 hours as evidenced by the sharp drop in voltage shown in FIG. 2. After 165 hours all the cells had ceased to operate.

Curve B shows the discharge curve of a typical cell having a capacity of 160 hours, containing a conventional silver oxide cathode and a zinc anode. The cell begins to discharge at 1.5 volts and continues to discharge at this voltage until almost all the silver oxide in the cathode is exhausted. Characteristically the cell containing the silver oxide cathode discharges at a constant voltage until almost complete exhaustion at which point the voltage drops rapidly. This constant voltage makes it difficult to determine the state of discharge of the cell. The problem is solved by the addition of a material, such as mercuric oxide, to produce a voltage step at a certain point in the discharge of the cell, as shown in curve A.

Figure 3:
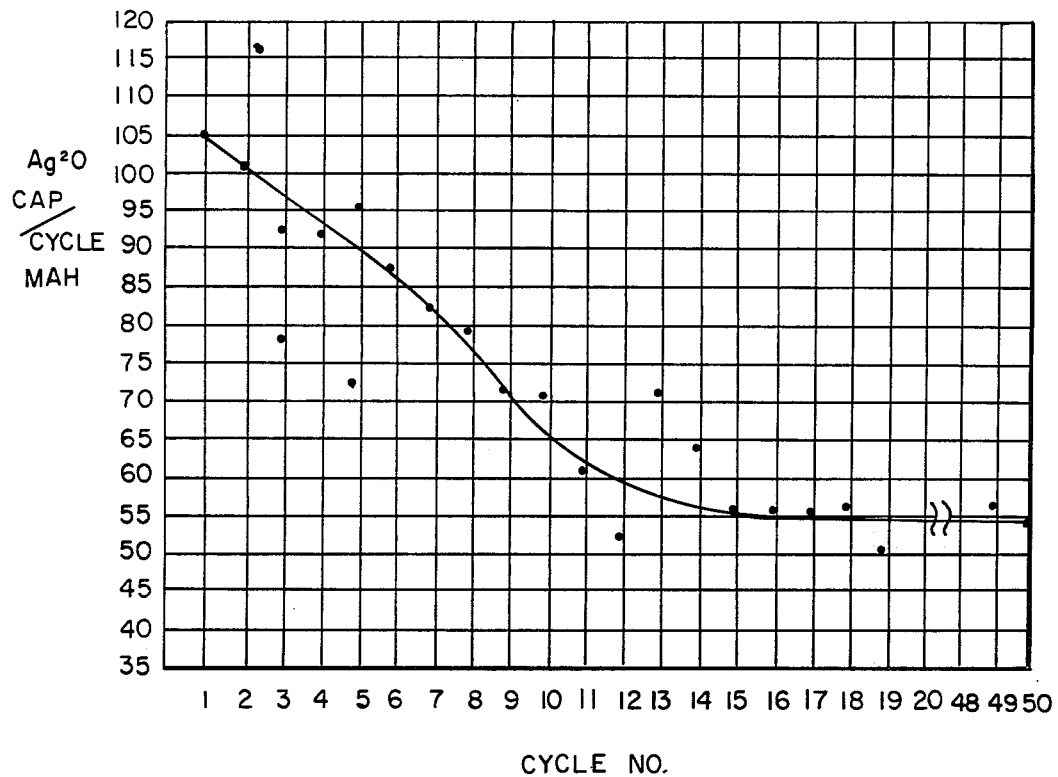
FIG. 3 is a graph comparing the average capacity of a twenty cell group, in two cell arrays, at each cycle of a series of discharge-recharge cycles.
Figure 4:
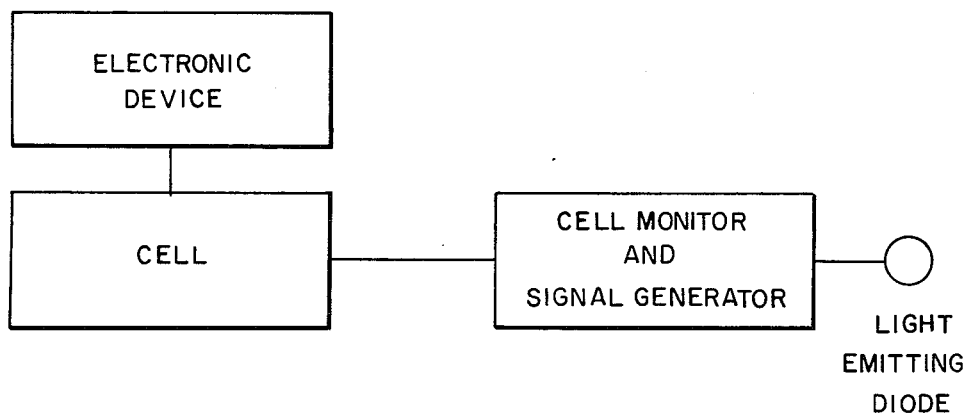
FIG. 4 is a diagrammatic illustration of the use, in one possible application, of a cell made in accordance with the invention.

FIG. 3 shows the ability of a cell containing the cathode of the present invention to accept a charge after repeated discharge-recharge cycles. The amount of charge the cell will accept decreases with the number of cycles and reaches a plateau of about 55 milliampere hours after about 15 cycles. This plateau has been found to continue for at least 50 cycles. FIG. 3 indicates that a cell discharged to the point where the silver oxide, but not the mercuric oxide is exhausted and then recharged, will deliver many more milliampere hours of total service than a cell simply discharged to total exhaustion. FIG. 4 is a diagrammatic illustration of the use, in one possible application, of a cell made in accordance with the invention. The cell powers an electronic device such as a watch or calculator, concurrently an electronic circuit of known construction monitors the voltage output of the cell. When the voltage output of the cell drops, due to the exhaustion of the silver oxide and the subsequent discharging of the mercuric oxide, the cell monitoring circuit detects this change and generates a signal that causes a light emitting diode to operate. The voltage produced by the mercuric oxide within the cathode supplies sufficient voltage to power the electronic device and the light emitting diode. The signal generator can, or course, be designed to generate other signals as desired to inform the user that the voltage has dropped and that it is time to recharge the cell.

The following examples of the preferred embodiment of the present invention are given to illustrate the construction and efficacy of the present invention. In the examples as well as throughout the specifications and claims all percentages are by weight unless otherwise indicated.

EXAMPLE I

A cell is constructed using the following materials and procedures. The cathode contains 49 percent monovalent silver oxide, 3 percent manganese dioxide, 30 percent mercuric oxide and 18 percent silver substantially homogeneously dispersed throughout the cathode. The anode contains 15 percent zinc oxide, an amalgam of 68 percent zinc and 13 percent mercury, and 4 percent of a gelling agent. Four layers of a barrier material, comprising two layers each of cellophane and irradiated polyethylene, are used to construct a barrier means between the anode and cathode. A layer of nonwoven cotton felt is used as an absorbent. The cathode, anode, barrier means, absorbent and an electrolyte comprising 35 percent potassium hydroxide, 6 percent zinc oxide, and 59 percent water are placed in a cell casing. The electrolyte is in contact with the anode, cathode, barrier means, absorbent and casing. The cell top is then crimped into place with a grommet.

Discharge curve A, in FIG. 2, is the average of ten cells constructed in this manner.

EXAMPLE II

A cell is constructed using the following materials and procedures. The cathode contains 52 percent monovalent silver oxide, 3 percent manganese dioxide, 30 percent mercuric oxide and 15 percent nickel substantially homogeneously dispersed throughout the cathode. The anode contains 15 percent zinc oxide, an amalgam of 68 percent zinc and 13 percent mercury, and 4 percent of a gelling agent. Four layers of a barrier material, comprising two layers each of cellophane and irradiated polyethylene are used to construct a barrier means between the anode and cathode. A layer of nonwoven cotton felt is used as an absorbent. The cathode, anode, barrier means, absorbent and an electrolyte of 35 percent potassium hydroxide, 6 percent zinc oxide and 59 percent water are placed in a cell casing. The electrolyte is in contact with the anode, cathode, barrier means, absorbent and casing. The cell top is then crimped into place with a grommet. This cell on discharge, had a discharge similar to that of curve A in FIG. 2.

The preceeding examples are for illustrative purposes only. It is understood that changes and variations can be made without departing from the spirit and scope of the present invention as defined in the following claims.

What is claimed is:

1. A method for improving the rechargeability of an electrochemical cell having an anode, a separator, an electrolyte, and a cathode comprising monovalent silver oxide comprising the steps of admixing with said silver oxide a material selected from the group consisting of mercuric oxide, cadmium oxide, cadmium hydroxide and manganese dioxide; and substantially homogeneously dispersing above about ten percent by weight of the cathode of a metal selected from the group consisting of silver, nickel and a mixture of silver and nickel throughout said cathode; whereby, upon discharging of said cell a stepped decrease in cell voltage occurs and recharging of said said cell can be effected prior to complete discharge of said cathode whereby a matrix of said metal will be maintained in said cathode to improve the rechargeability of said cathode.

2. The method of claim 1 wherein said metal comprises silver.

3. The method of claim 1 wherein said metal comprises nickel.

4. The method of claim 1 wherein said cathode contains said metal in an amount sufficient to improve the rechargeability of said cathode.

5. The method of claim 1 wherein said cathode contains said metal in an amount up to about forty percent by weight of the cathode.

6. The method of claim 1 wherein said cathode contains said material in an amount of from about twenty percent to about sixty percent by weight of the cathode.

7. The method of claim 6 wherein said anode further comprises mercury and zinc oxide.

8. The method of claim 1 wherein said anode comprises zinc.

* * * * *